1,992,720

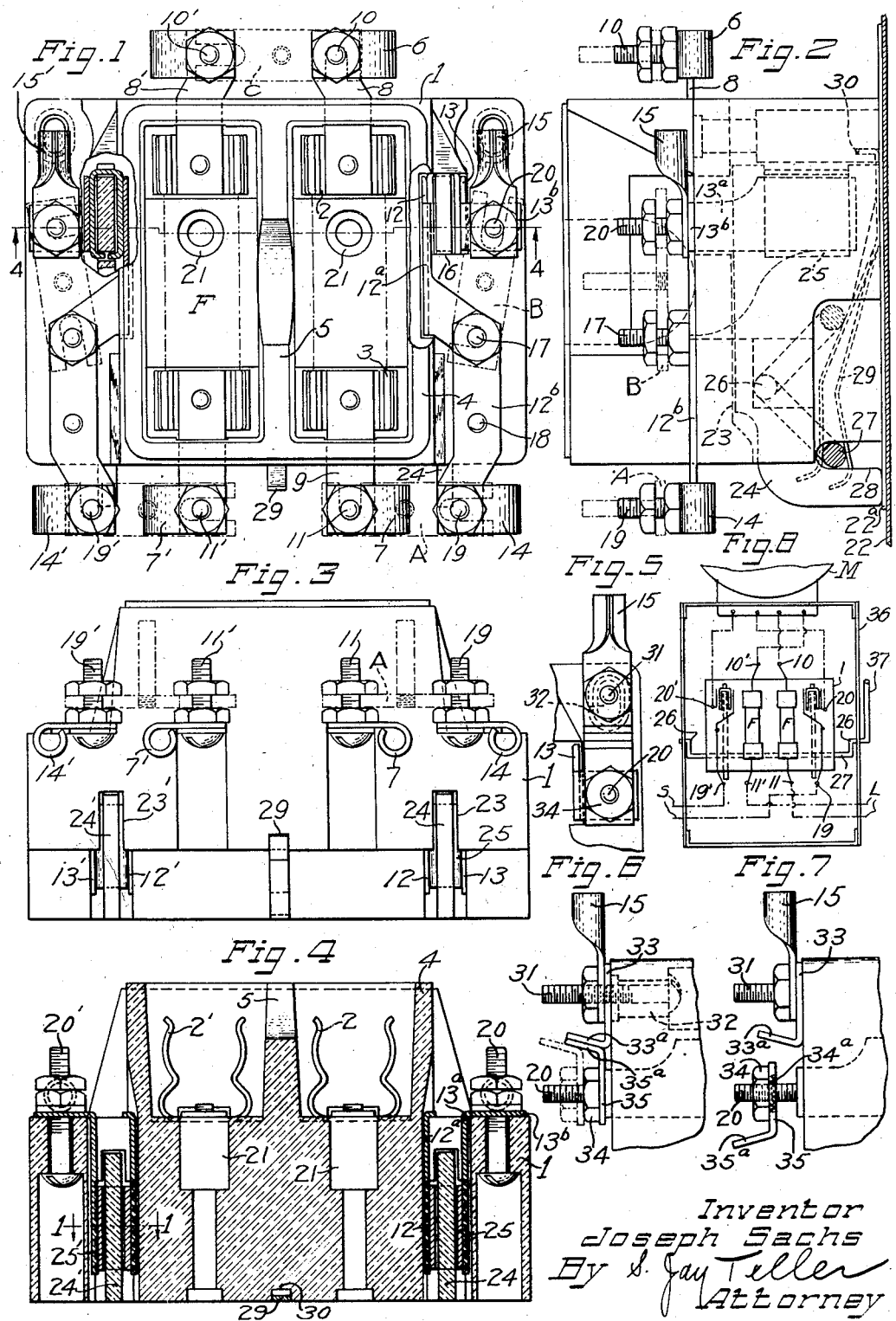
Feb. 26, 1935. J. SACHS 1,992,720
ELECTRIC METER SERVICE APPLIANCE
Original Filed April 2, 1932
Inventor
Joseph Sachs
By S. Jay Teller
Attorney Patented Feb. 26, 1935

UNITED STATES PATENT OFFICE 1,992,720

ELECTRIC METER SERVICE APPLIANCE

Joseph Sachs, West Hartford, Conn.

Original application April 2, 1932, Serial No. 602,859. Divided and this application March 1, 1933, Serial No. 659,141

5 Claims. (Cl. 175—369)

My invention relates in part to appurtenances and appliances providing for the complete control, maintenance and protection of an electric service installation including a meter. In such installations it is usual to place, at a point in proximity to where the service wires enter the building, a switch and also an automatic overload protective device such as a fuse. There is also installed at this point by the service company their electric meter for recording the energy consumed. In such electric meter service installations the necessary devices and appliances are ordinarily combined in a single complete installation arrangement providing for the turning on and off of the current by the switch, the automatic protection of the service by the fuses, the testing of the meter by means of suitable arrangements of the switch and fuse parts or by the provision of additional testing facilities, and a suitable enclosure or box by means of which the aforesaid parts and also a portion of the meter are mechanically protected so as to prevent tampering and insure safety.

In my reissued Patent No. 18,419 I have shown and claimed a meter service appliance having devices for holding or clamping inflexible by-pass links, these being combined with the switch and fuse parts and so related to each other that similar links may be used interchangeably either for establishing a by-pass connection from service to load or for establishing a by-pass connection between the switch contacts. In accordance with the present invention I utilize the combination last above set forth, but so arrange the several parts that certain additional advantages are attained. One such advantage is that the service-to-load by-pass is at the bottom of the appliance and not at the side as shown in the said reissued patent.

A further object of the invention is to provide a switch of the type last above described having means additional to the switch parts and connected in series therewith for interrupting the circuit between the switch and the meter.

In my Patent No. 1,301,175 for Electric service and meter testing system dated April 22, 1919 I have disclosed and claimed a meter service appliance adapted for meter testing, wherein there are circuit controlling means such as a switch connected on the service side of the meter and circuit-controlling means including a fuse connected on the load side of the meter, the appliance including an enclosure which renders the service side parts inaccessible while permitting access only to the fuse and fuse contacts on the load side. In accordance with the present invention I am enabled to combine the advantageous feature set forth in the last said patent with the other novel features which have been briefly outlined and which are hereinafter set forth in detail.

This application constitutes a division of my copending application for System of circuit controlling devices, Serial No. 602,859 filed April 2, 1932.

In the accompanying drawing I have shown two embodiments of the invention and it will be understood that the drawing is intended for illustrative purposes only and is not to be construed as defining or limiting the scope of the invention, the claims forming a part of this specification being relied upon for that purpose.

Of the drawing:

Fig. 1 is a front view of a meter service unit embodying the invention, this view showing only the insulating base and the parts carried thereby and omitting the enclosing box. A portion of this view is in section along the line 1—1 of Fig. 4.

Fig. 2 is a side view of the unit shown in Fig. 1, this view also showing a portion of the rear wall of the enclosing box.

Fig. 3 is a bottom view of the unit shown in Fig. 1.

Fig. 4 is a horizontal sectional view taken along the line 4—4 of Fig. 1.

Fig. 5 is a fragmentary view similar to Fig. 4, but showing an alternate embodiment of the invention.

Fig. 6 is a fragmentary view similar to Fig. 2 and showing a side elevation of the alternative construction shown in Fig. 5.

Fig. 7 is a view similar to Fig. 6, but showing the parts in different relative positions.

Fig. 8 is a diagrammatic front view showing a unit embodying the invention enclosed in a box and also showing the electrical connections normally used.

In Figs. 1 to 4 I have shown one of the units embodying the invention. All of the conducting parts of the unit are mounted upon an insulating base 1, which base is preferably so formed as to be adapted not only for use in the unit shown in Figs. 1 to 4, but also for use in other units as described in my said copending application Serial No. 602,859. The base 1 is shown as adapted for the mounting thereon of the conducting parts for two legs of the circuit. Inasmuch as these parts for the two legs are similar to each other except for reversals of position I shall confine myself in the main to one set of such parts, that is, those at the right.

Mounted upon the front of the base 1 is a pair of fuse contacts 2 and 3, held in place by screws engaging the said contacts from the rear. I have shown contacts adapted to receive a cartridge enclosed fuse, but as to this I do not necessarily limit myself. Surrounding the fuse contacts is a barrier 4 and when there are two pairs of contacts as shown there is a partition 5 between them. Connected respectively with the fuse contacts 2 and 3 are wire terminals 6 and 7, these terminals being located respectively at the top and bottom of the base 1. As shown there are conducting straps 8 and 9 which extend through openings in the top and bottom of the barrier 4, these being connected at their inner ends with the respective fuse contacts and at their outer ends carrying screws 10 and 11 by means of which the said wire terminals are attached.

Mounted on the base 1 adjacent the rear thereof are switch contacts 12 and 13. These contacts are preferably spaced apart transversely and have oppositely facing substantially parallel contact faces. Electrically connected with the said contacts 12 and 13 are wire terminals 14 and 15. Preferably the base 1 is provided with an opening 16 extending from front to rear thereof and the switch contacts 12 and 13 are so positioned as to be in register with and visible through the said openings 16. As shown the switch contact 12 has an integral forward extension 12$^a$ which projects through the opening 16 and a further extension 12$^b$ which lies along the front of the base and is held in place by means of a nut on a screw 17 and also by means of a screw 18. The terminal 14 is connected with the extension 12$^b$ by means of a screw 19. The contact 13 has a forward extension 13$^a$ and a lateral extension 13$^b$, this latter extension being engaged by a screw 20 which holds the contact in place. The same nut also holds the terminal 15.

By preference the base 1 is so constructed as to be mounted substantially directly upon a rear supporting wall which may be the rear wall 22 of an enclosing cabinet, as shown for instance in Fig. 2. The base is held in place by means of screws in the holes 21, 21. If desired a sheet 22$^a$ of insulating material may be interposed between the base and the rear wall.

A movable switch element is provided for making and breaking electrical connection between the stationary switch contacts 12 and 13, and preferably there is a rectilinearly movable switching member of which the said switch element is a part. When the base is constructed for being mounted as described, it is preferably provided with a slot 23 which extends vertically and which intersects the before-mentioned opening 16. Longitudinally movable in the slot 23 is an insulating element 24 in the form of a flat plate which is guided at the front by the front wall of the slot 23 and which is guided at the rear by the rear supporting wall to which the block 1 is attached. Carried by the insulating element 24 is a conducting element 25 which has parallel elements 24 and 25 is in the position shown in Figs. 1 and 2, electrical connection is established between the two switch contacts; but when the switching member is moved upward from the said position electrical connection is broken. Preferably the switching member 24—25 is operated by means of a pivoted member 26 having a crank portion 27 extending through a transverse slot 28 in the said insulating element 24. A recess is formed in the lower rear portion of the base to permit the cranked portion of the operating member to move. The pivoted member 26 is preferably mounted independently of the block 1, as for instance in the side walls of the enclosing box.

In order that the operating member 26 may be releasably held either in its circuit making position or in its circuit breaking position I provide a spring retaining member 29 which is preferably clamped between the body of the block 1 and the rear supporting wall. As shown the block 1 is provided at the rear with a groove of sufficient depth to receive the upper end portion of the spring 29 and is further provided with a notch 30 into which projects an angularly bent portion of the spring. It will be observed that when the block is secured in place with respect to the supporting wall the spring 29 is so held that it cannot be displaced. The spring 29 engages the crank portion 27 of the operating member and serves to releasably hold it either in the circuit making position shown by full lines in Fig. 2 or in the circuit breaking position shown by dot-and-dash lines in Fig. 2.

Preferably the unit shown in Figs. 1 to 4 is provided with devices for holding rigid by-pass links adapted for use during meter testing. As shown the screws 11 and 19 are so spaced as to be adapted to engage a by-pass link A of standard form, the said link being adapted to be clamped in place by means of additional nuts on the said screws as clearly shown in Fig. 3. Similarly the two screws 17 and 20 are so spaced as to be adapted to engage a by-pass link B, which link is preferably of exactly the same size and type as the link A. The link B is held in place by additional nuts on the screws 17 and 20 as clearly shown in Fig. 2. Preferably the connecting strap 8 and the corresponding strap 8' at the left are so formed as to position the screw 10 and the corresponding screw 10' at the left in such spaced relation that the said screws are adapted to engage a by-pass link C which is preferably of the same type and size as the aforesaid links A and B.

Figs. 5, 6 and 7 are fragmentary views of a unit similar to that shown in Fig. 1 to 4 with the single exception that a manually operable circuit interrupting means is interposed in the circuit between the upper switch contact and the corresponding wire terminal. The terminal 15 instead of being held by a nut on the screw 20 is held by a nut on a screw 31 which extends through a hole 32 in the upper corner portion of the base. Also held by the same nut is a conducting member 33 having an angularly disposed contact portion 33$^a$. Mounted on the screw 20 is a nut 34 and associated with the nut is a conducting element 35 having an angularly disconnected with the switch contact 13 by means of the two conducting elements 35 and 33. When it is desired to break the circuit between the switch contact 13 and the terminal 15 the nut 34 is rotated to raise the element 35 to the position shown by dot-and-dash lines in Fig. 6. The said element 35 can then be reversed in position as shown in Fig. 7, thus providing a break in the circuit between the two elements 35 and 33.

In Fig. 8 I have shown on a reduced scale a box of the type which may be used with either of the described units. The box as an entirety is represented at 36 and the before-mentioned operating member 26 is pivotally mounted in the side walls of the box. The said member includes a handle 37 which projects at one side of the box and is manually operable. The box may be provided with an openable front cover, but such a cover is not shown in Fig. 8.

Service wires S are connected to the wire terminals held by the screws 19, 19'. Connected with the wire terminals held by the screws 20, 20' are wires leading to the meter M and connected with the wire terminals held by the screws 10, 10' are wires leading from the said meter. Load wires are connected with the wire terminals held by the screws 11, 11'. It will be apparent that when the appliance is connected as described there is provided a sequence of switch—meter—fuse. The switch being ahead of the meter makes it possible for the meter to be completely disconnected from the service wires at any time by merely opening the switch in the regular way; and the location of the fuses after the meter makes it impossible for theft of current to be effected by making connections to the contacts or parts.

The appliance shown in Fig. 8 is so constructed as to facilitate meter testing. In connection with Figs. 1 to 4 I have described in detail the devices for the attachment of by-pass links. It will be apparent that by putting links A in place between the screws 19, 11 and 19', 11' by-pass connections are established directly from the service wires S to the load wires L, thus enabling the customer's service to be maintained during meter testing. This service-to-load by-pass is at the bottom of the device, which location is ordinarily the most convenient for the meter tester.

If it is desired to disconnect the load side of the meter from the load wires this can be done by removing the fuses F, F from their contacts. If it is desired to connect the service side of the meter from the service wires this can be done by simply opening the switch in the usual way. If it is desired to disconnect only one coil of the meter from its service wire without disconnecting the other this can be done by first putting in place a link B at the side which is to remain connected and then opening the switch in the usual way. If it is desired to connect the two coils of the meter in series this can be done by putting in place a link C to connect the terminals held by the screws 10, 10'.

It will be understood that the several nuts on the aforesaid link holding screws are also adapted to serve as test contacts for the attachment of flexible leads extending to a test meter or other meter testing instrumentality. The said screws are longer than would otherwise be necessary and the projecting forward ends of these screws can be used, if preferred, for holding the clamps that are commonly provided on the flexible leads of testing apparatus.

While I have shown in Fig. 8 a sequence of switch—meter—fuse, it will be obvious that by reversing the positions of the several wires there may be provided a sequence of fuse—meter—switch.

What I claim is:

1. In an electric meter service appliance, the combination of an insulating base, a pair of fuse contacts mounted on the front of the base, a pair of transversely spaced switch contacts mounted on the base adjacent the rear thereof, a switching member at the rear of the base comprising a conducting element movable between the switch contacts to electrically connect them, a pair of wire terminals at the front of the base respectively adjacent the top and bottom thereof and connected respectively with the fuse contacts, a second pair of wire terminals adjacent the front of the base and connected respectively with the switch contacts, one of the last said terminals being above the other and both of them being transversely spaced from the said fuse contacts and terminals, and a pair of devices at the front of the base respectively connected with the last said terminals and adapted for holding a rigid by-pass link.

2. In an electric meter service appliance, the combination of an insulating base, a pair of fuse contacts mounted on the front of the base, a pair of transversely spaced switch contacts mounted on the base adjacent the rear thereof, a switching member at the rear of the base comprising a conducting element movable between the switch contacts to electrically connect them, a pair of wire terminals at the front of the base respectively adjacent the top and bottom thereof and connected respectively with the fuse contacts, a second pair of wire terminals adjacent the front of the base and connected respectively with the switch contacts, one of the last said terminals being above the other and both of them being transversely spaced from the said fuse contacts and terminals, and two pairs of link holding devices having one device of each connected with one of the switch terminals and having the other devices of the said pairs connected respectively with one fuse terminal and with the remaining switch terminal, the link holding devices of each pair being adapted for holding a rigid by-pass link and the devices of the two pairs being similarly constructed and substantially uniformly spaced so they may interchangeably hold by-pass links of identical construction and size.

3. In an electric meter service appliance as set forth in claim 2, wherein the described parts are duplicated for two legs of a circuit, wherein there is an additional pair of link holding devices adapted for holding a rigid by-pass link and normally connected respectively with the remaining fuse terminals in the two legs, and wherein the link holding devices of the several pairs are all similarly constructed and so spaced they may interchangeably hold by-pass links of identical construction and size.

4. In an electric meter service appliance, the combination of an insulating base, a pair of fuse contacts on the base, a pair of stationary switch contacts associated with the base, a manually operable switching element movable to make and break electrical connection between the switch contacts, a pair of wire terminals electrically connected respectively with the switch contacts and adapted respectively for the connection of a service wire and of a wire leading to the meter, a pair of wire terminals normally electrically connected respectively with the fuse contacts and adapted respectively for the connection of a wire leading from the meter and of a load wire, and a circuit interrupting means on the base interposed in the circuit between one switch contact and the corresponding meter wire connectible terminal, the said means being separate from the said contact and terminal and being manually operable independently of the switching element.

5. In a fused electric switch, the combination of an insulating base, a pair of fuse contacts mounted on the front of the base, a pair of transversely spaced switch contacts mounted on the base adjacent the rear thereof, a switching member at the rear of the base comprising a conducting element movable between the switch contacts to electrically connect them, a pair of wire terminals at the front of the base respectively adjacent the top and bottom thereof and connected respectively with the fuse contacts, a second pair of wire terminals adjacent the front of the base and connected respectively with the switch contacts, one of the last said terminals being above the other and both of them being transversely spaced from the said fuse contacts and terminals, and a circuit interrupting means on the base interposed in the circuit between one switch contact and the corresponding wire terminal, the said means being separate from the said contact and terminal and being manually operable independently of the switching element.

JOSEPH SACHS.